United States Patent
Tang et al.

(10) Patent No.: US 10,797,544 B2
(45) Date of Patent: Oct. 6, 2020

(54) ROTOR FOR SHAPING AIRGAP FLUX DENSITY

(71) Applicant: Ford Global Technologies, LLC, Dearborn, MI (US)

(72) Inventors: Chun Tang, Canton, MI (US); Wei Wu, Northville, MI (US); Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 671 days.

(21) Appl. No.: 15/380,022

(22) Filed: Dec. 15, 2016

(65) Prior Publication Data
US 2018/0175685 A1    Jun. 21, 2018

(51) Int. Cl.
*H02K 1/27* (2006.01)
*H02K 21/14* (2006.01)

(52) U.S. Cl.
CPC ......... *H02K 1/2766* (2013.01); *H02K 1/2773* (2013.01); *H02K 21/14* (2013.01); *H02K 2201/00* (2013.01); *H02K 2213/03* (2013.01)

(58) Field of Classification Search
CPC .... H02K 1/276; H02K 1/2706; H02K 1/2766; H02K 1/2773; H02K 21/14; H02K 2201/00; H02K 2213/03
USPC .................................................... 310/156.53
See application file for complete search history.

(56) References Cited

U.S. PATENT DOCUMENTS

| | | | | |
|---|---|---|---|---|
| 5,751,089 A | * | 5/1998 | Stridsberg | H02K 1/185 310/266 |
| 8,541,919 B2 | | 9/2013 | Lokhandwalla et al. | |
| 2007/0024130 A1 | * | 2/2007 | Schmidt | H02K 1/32 310/61 |
| 2008/0103632 A1 | * | 5/2008 | Saban | H02K 3/28 700/286 |
| 2014/0125182 A1 | * | 5/2014 | Takahashi | H02K 1/2766 310/156.11 |
| 2015/0054372 A1 | | 2/2015 | Chung et al. | |

FOREIGN PATENT DOCUMENTS

DE    102014106188 A1    1/2015

* cited by examiner

*Primary Examiner* — Shawki S Ismail
*Assistant Examiner* — Monica Mata
(74) *Attorney, Agent, or Firm* — David Kelley; Brooks Kushman, P.C.

(57) ABSTRACT

An electric machine may include a rotor defining a cavity containing a magnet, an outer periphery and a top bridge therebetween. The top bridge defines at least two segments. Each of the segments has a width that is minimum closest to a Q-axis, is maximum closest to a D-axis, and monotonically increases from the minimum to the maximum such that during operation a rate of change of rotor magnetomotive force associated with each segment differs.

19 Claims, 3 Drawing Sheets

ROTOR FOR SHAPING AIRGAP FLUX DENSITY

TECHNICAL FIELD

This disclosure relates to a permanent magnet electric machine rotor.

BACKGROUND

Electric machines typically employ a rotor and a stator to produce torque. Electric current flows through windings of the stator to produce a magnetic field. The magnetic field generated by the stator may interact with permanent magnets affixed to the rotor to generate torque.

SUMMARY

According to one embodiment of this disclosure, an electric machine includes a rotor defining a cavity containing a magnet, an outer periphery and a top bridge therebetween. The top bridge defines at least two segments each having a width that is minimum closest to a Q-axis, is maximum closest to a D-axis, and monotonically increases from the minimum to the maximum such that during operation a rate of change of rotor airgap flux density associated with each segment differs.

According to another embodiment of this disclosure, an electric machine includes a rotor having an outer periphery and defining a plurality of cavities. The cavity is comprised of a first and second leg spaced apart by a distance $W_C$ and oriented along an angle $\alpha$. The first leg and second leg close out the cavity by a segment $L_1$ and segment $L_2$. $L_1$ is spaced apart by $W_1$ and $W_2$, and segment $L_2$ is spaced apart by $W_2$ and $W_3$, and $$W_1 \leq W_2$$
$$W_2 < W_3$$
$$L_1 < \frac{1}{3} \cdot \frac{W_C}{\sin\alpha}$$
$$L_2 > \frac{2}{3} \cdot \frac{W_C}{\sin\alpha}$$

According to yet another embodiment of this disclosure, an electric machine has a rotor. The rotor defines a cavity containing a magnet, has an outer periphery and a top bridge therebetween. The top bridge has at least two segments. Each segment has a distance between the outer periphery and the top bridge that is minimum closest to a Q-axis, is maximum closest to a D-axis, and monotonically increases from the minimum to the maximum such that during operation a rate of change of rotor magnetomotive force associated with each segment differs.

DETAILED DESCRIPTION

Figure 1:
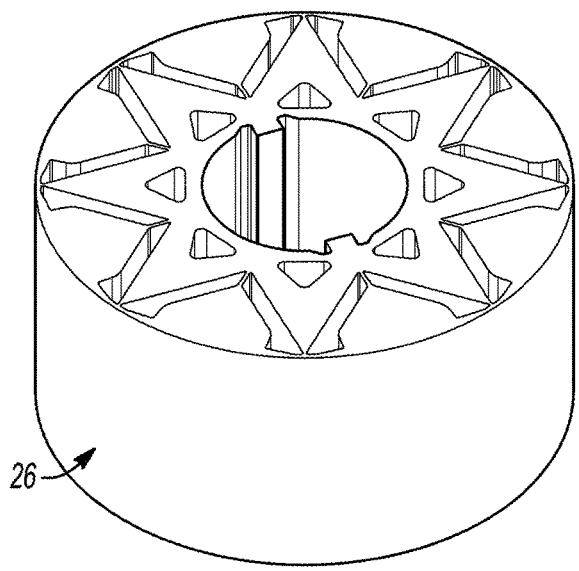
FIG. 1 is a perspective view of a stack of laminations of a rotor of an electric machine.

Permanent magnet machines feature magnets mounted on or embedded within a rotor surrounded by a stator. The magnets mounted on or embedded in the rotor couple with the motor's current-induced, internal magnetic fields generated by electrical input to the stator. Similar to other alternating current (AC) induction motors, electrical power is supplied through the stator windings.

Separate groups of stator teeth and the stator windings form multiple magnetic poles that produce a flux flow pattern when the stator coils are energized with a multiphase sinusoidal voltage. A three-phase electric machine, for example, would have a total of 8 poles and 48 slots. A group of 6 slots would be characteristic of each pole of the particular examples of a 48 slot electric machine herein disclosed. The magnetic flux created by the stator windings interacts with rotor flux created by the permanent magnets in a rotor of a permanent magnet machine, so that a rotor torque is created as the stator windings are excited with a multiphase voltage.

Permanent magnets of the rotor may be positioned or oriented in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The internal portion of the "V" has similar magnetic poles that cooperate to form a magnetic pole of the rotor. Each of the permanent magnets may be disposed in pockets or cavities to retain the permanent magnets. These pockets or cavities are typically rectangular and sized to receive the permanent magnets. The cavities may be slightly oversized at opposite ends to limit magnetic flux leakage between north and south poles of the individual permanent magnets. Voids or cavities in the rotor core impede magnetic flux because a vacuum has a relatively low magnetic permeability compared to the rotor core material (e.g., electric steel).

The torque created by the stator windings and the rotor flux field develops a uniform torque component and a varying torque component. The total output torque of the electric machine is a combination of both components. Because of the variable torque component, a torque ripple phenomenon is created, which results in motor torque output speed oscillations when the electric machine is acting as a motor. Torque ripple in electric motors is caused by the interaction between the harmonic magnetic fluxes produced by the permanent magnets and the current in the stator winding. Reduction in the harmonic flux produced by the permanent magnet will lead to a reduction in the torque ripple as well as the iron loss.

For most applications, the torque ripple needs to be reduced to a manageable level, particularly in the case of hybrid electric vehicle powertrain applications where the torque ripple components occur at variable frequencies proportional to the output shaft speed of an electric traction motor. Higher order of frequencies usually can be filtered out by a limited bandwidth in the mechanical components of the powertrain. Lower frequencies, however, give rise to mechanical oscillations that cannot readily be filtered. Such oscillations are not acceptable in a hybrid electric vehicle powertrain. Presence of torque ripples from the motor at the lower frequencies may cause the motor to produce undesirable vibration and noise.

In general, rotor laminations may have pockets or cavities arranged around the periphery of the rotor to house permanent magnets. The permanent magnets may be situated to interact with the magnetic field generated by the stator windings. These pockets or cavities may include flux-limiting areas to minimize undesired flux leakage between magnets.

The shape of the rotor and its associated cavities has an effect on the flux distribution along the surface of the rotor. The distribution of flux affects the torque ripple and iron loss of the electric machines. The shape of the rotor has a gradually changing top bridge width. The gradual change of the top bridge width results in a smooth change of reluctance along the bridge. This effectively reduces the rotor flux harmonics such that a reduction in torque ripples and iron loss is achieved. The size and shape of the cavities within the rotor as claimed are aimed at reducing the iron loss within permanent magnet motors.

Figure 2:
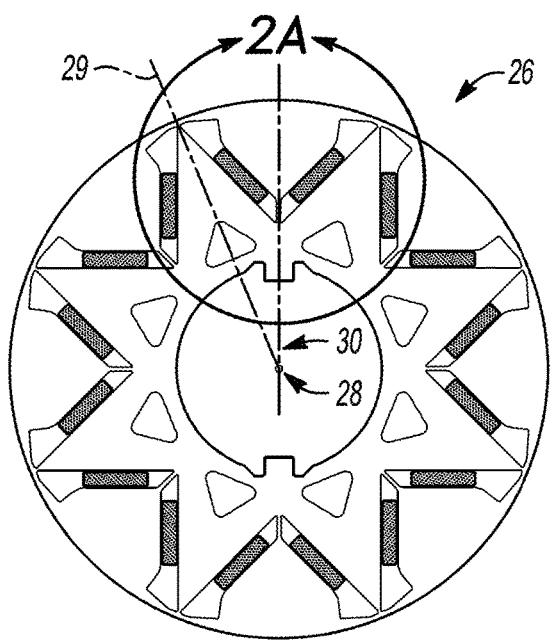
FIG. 2 is a top view of a lamination.

Referring to FIGS. 1-2, a rotor 26 of an electric machine is illustrated. The rotor 26 includes a center point 28 that defines the axis of rotation of the rotor. A D-Axis 30 extends from the center point 28 and is perpendicular to the axis of rotation. Q-axis 29 is shown as 22.5 mechanical degrees from the D-axis 30, and it is separated by 90 electrical degrees.

Figure 2A:
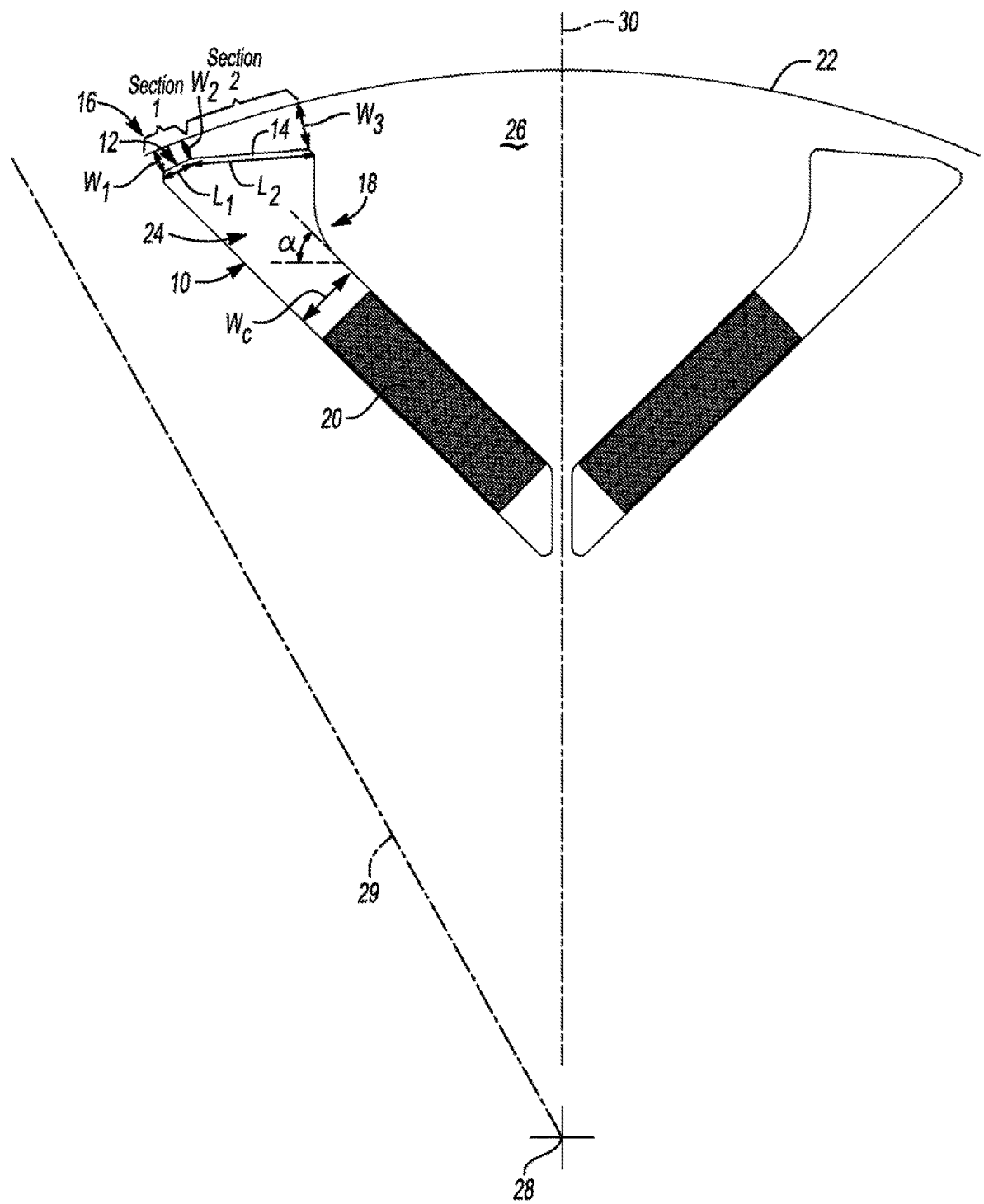
FIG. 2A is a detail view of the detail circled in FIG. 2.

Referring to FIG. 2A, a rotor 26 defining a magnet cavity 24 and a magnet 20 is illustrated. The rotor 26 is preferably a circular sheet of electromagnetic-permeable metal. The rotor 26 includes a center point 28 that is surrounded by the outer periphery 22 of the rotor 26. One or more magnet cavities 24 are positioned throughout the rotor 26. A direct current axis (D-axis) 30 bisects two of the magnet cavities 24 that are spaced apart from each other. The D-Axis 30 is the axis of the field winding in the direction of the direct-current field. A quadrature axis (Q-axis) 29 is shown extending from the center point 28 along an angle approximately 22.5° with respect to the D-axis 30. While the Q-axis 29 is shown as 22.5 mechanical degrees from the D-axis 30, it is separated by 90 electrical degrees.

Hereinafter, the cavities 24 will be referred to in the singular tense. It should be appreciated the cavities may be of any size and shape, so long as the top bridge 16 of the rotor includes sections of monotonically increasing size. At least one of the magnet cavities 24 within the rotor 26 will have the size, shape and location as described below. The magnet cavity 24 is V-shaped and the wider top portion of the V is disposed near the outer periphery 22 of the rotor 26. The bottom portion of the V is sized to accommodate a magnet 20 and has a width of $W_C$. A first leg 10 and second leg 18 make up the bottom portion of the V-shaped cavity. The upper portion of the V-shaped cavity 24 connects the first leg 10 and second leg 18. The upper portion of the V-shaped cavity is comprised of a first segment 12 and a second segment 14 which close out the cavity between the first leg 10 and the second leg 18. A portion of the first leg 10 and second leg 18 are oriented by an angle $\alpha$ with respect to the D-axis 30. The first segment 12 originates from the first leg 10 in a direction transverse from the first leg 10 and has a length of $L_1$. The first segment 12 is spaced apart from the outer periphery 22 of the rotor 26 by a distance of $W_1$. The first segment 12 is nearest to the Q-axis 29. The second segment 14 has a length $L_2$, that is a straight-line distance the first section 12 and the end of the second leg 18. The segments 12 and 14 are made of straight lines. The width between the point at which $L_1$ terminates and $L_2$ originates is spaced apart from the outer periphery 22 of the rotor 26 by a distance of $W_2$. The length of $L_1$ is less than ⅓ of the width $W_C$ divided by sin of $\alpha$. The length of $L_2$ is greater than ⅔ of the width $W_C$ divided by sin of $\alpha$. The distance of $W_1$ and the distance $W_2$ may be less than or equal to each other. The outer periphery 22 and the point at which the second segment 14 terminates are spaced apart by a distance of $W_3$. The distance of $W_3$ is greater than the distance of $W_2$.

Figure 3:
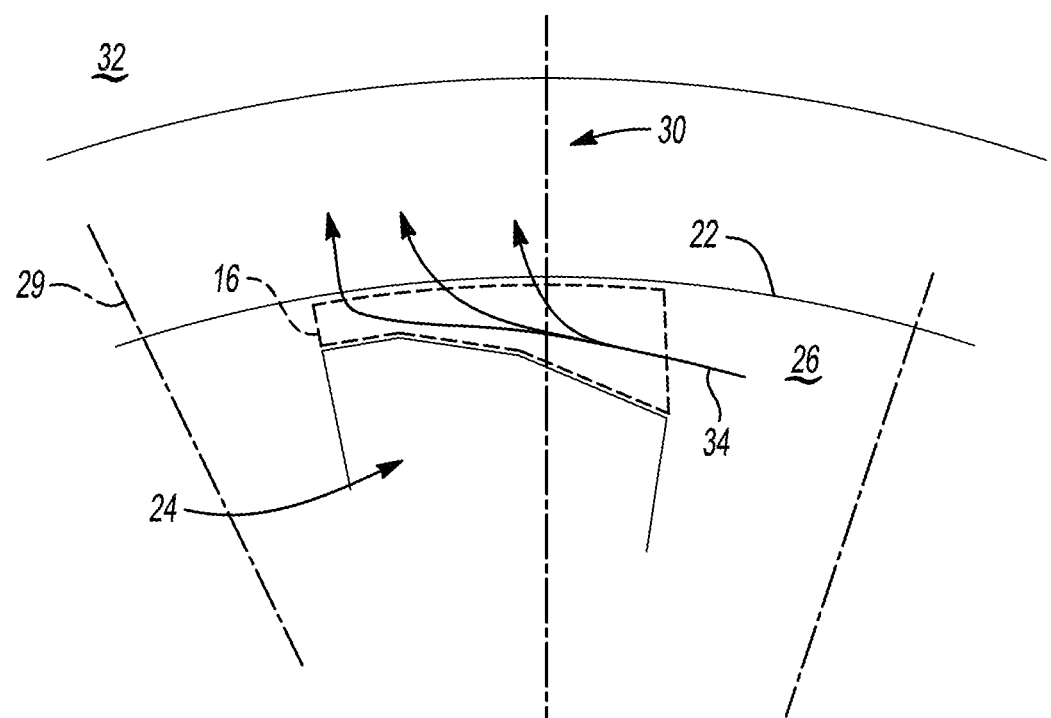
FIG. 3 is a detail view of the rotor top bridge.

Referring to FIG. 3, a detailed view of an exemplary rotor is illustrated. The rotor 26 is circumferentially surrounded by a stator 32. As described in FIG. 2, a cavity 24 is defined by the rotor 26. The cavity has an upper portion defined by two segments. The top bridge is defined by the upper portion of the cavity and the outer periphery 22 of the rotor 26. Directional arrows 34 illustrate the movement of the magnetic field through the rotor 26.

As was stated above, the shape of the rotor and its associated cavities has an effect on the flux distribution along the surface of the rotor. Because the magnetic field moves from the right to left, with reference to FIG. 3, the magnetic field is strongest near the widest portion of the top bridge 16. Because the top bridge 16 is at its widest point, it is capable of distributing the stronger portion of the magnetic field over a greater surface area. This distribution of the magnetic field over a surface area alters the airgap flux density as the shape of the cavity narrows. The distribution of airgap flux affects the torque ripple and iron loss of the electric machines. As mentioned, the shape of the cavity creates a gradual width change in the top bridge 16. The gradual change of the top bridge 16 width results in a smooth change of reluctance along the bridge. This effectively reduces the rotor flux harmonics such that a reduction in torque ripple and iron loss is achieved. The size and shape of the cavities within the rotor as claimed are aimed at reducing the iron loss within permanent magnet motors. The gradual reduction in the width of the top bridge 16 facilitates a more even distribution of airgap flux density.

Figure 4:
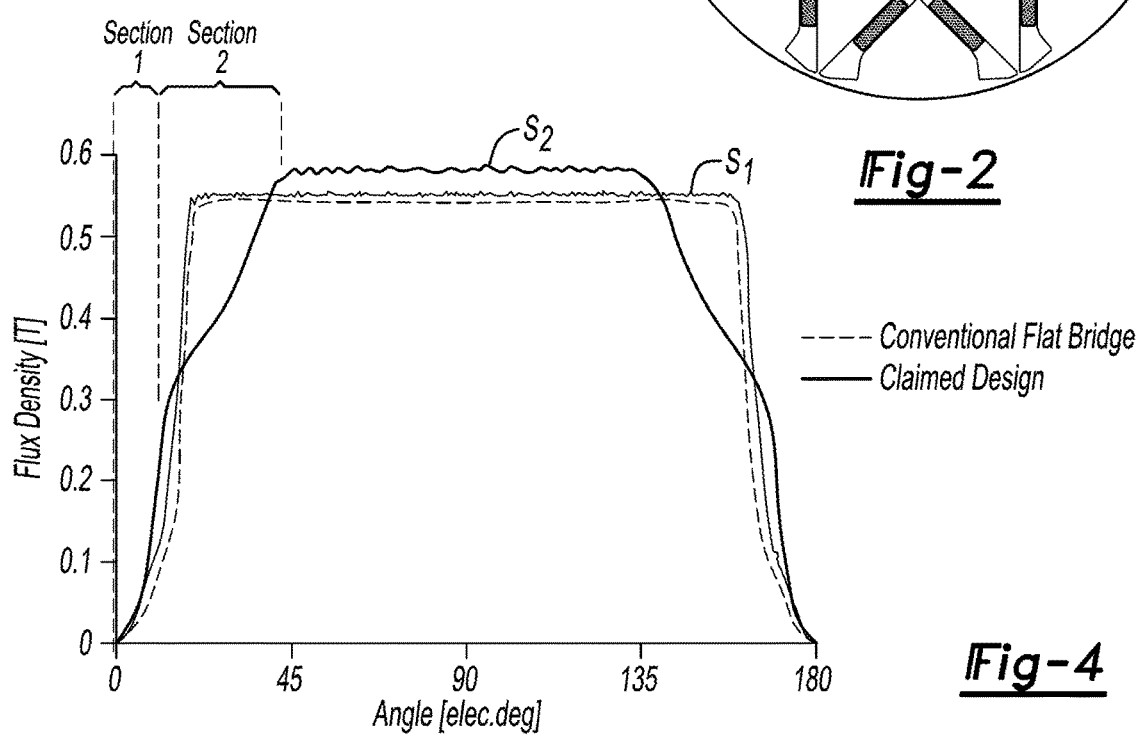
FIG. 4 is a graph of the magnetomotive force versus angle for the attribute and the conventional flat bridge.

Referring to FIG. 4, a chart of Magnetomotive Force [ampere-turn] versus angle [electric degree] is illustrated. A dashed line S1 represents the conventional flat bridge design. The conventional flat bridge S1 has a substantially square shape. A solid line, S2, represents the claimed design of the rotor as claimed. As the flux density approaches the peak at approximately 0.6 [ampere-turn], the flux density gradually increases over two segments, Segment 1 and Segment 2. As is evidenced by Table 1, the stepped change in magnetomotive force before approaching a saturation point of the rotor 26 results in a decrease in torque ripple and iron loss.

TABLE 1

| Attribute | Decrease From Baseline Conventional Flat Bridge |
|---|---|
| Torque Ripple | −70% |
| Iron Loss at Field-Weakening Condition | −18% |

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
a rotor defining a cavity containing a magnet, an outer periphery and a top bridge therebetween, wherein the cavity includes a first leg and a second leg each extending to and being separate from the top bridge wherein the first leg and the second leg sandwich the magnet,
wherein the top bridge defines a first segment and a second segment collectively extending between the first leg and the second leg, wherein the first segment has a first length $L_1$ and is positioned closer to the Q-axis than the second segment, and the second segment has a second length $L_2$ greater than the first length $L_1$,
wherein the first segment and the second segment are each spaced apart from the outer periphery by a width that is minimum closest to a Q-axis, is maximum closest to a D-axis, and monotonically increases from the minimum to the maximum such that during operation a rate of change of rotor airgap flux density associated with each segment differs.

2. The rotor of claim 1, wherein the rates of change of rotor air gap flux density result in a reduction of torque ripple and iron loss.

3. The rotor of claim 2, further comprising a stator circumferentially surrounding the rotor, wherein the rotor and the stator each generate a magnetic field, wherein each of the magnetic fields interact to define a harmonic level, and wherein as the harmonic level increases, torque ripple and iron loss increase.

4. The rotor of claim 3, wherein the harmonic level is at least based on air gap flux density.

5. The rotor of claim 1, wherein each of the first segment and the second segments are straight lines.

6. The rotor of claim 4, wherein the first segment is spaced apart from the outer periphery by a distance of $W_1$ and $W_2$, and $W_1$ and $W_2$ are approximately equal, and wherein the second segment is spaced apart from the outer periphery by a distance $W_3$, and $W_3$ is greater than $W_2$.

7. The rotor of claim 1, wherein the first and second legs extend along an angle $\alpha$ with respect to the D-axis and have a width $W_C$.

8. The rotor of claim 7, wherein the first length $L_1$ is less than one-third of $W_C$ divided by sin of $\alpha$.

9. The rotor of claim 8, wherein the second length $L_2$, is less than two-thirds of $W_C$ divided by sin of $\alpha$.

10. An electric machine comprising:
a rotor having an outer periphery and defining a plurality of cavities, each having a magnet disposed therein, wherein each of the cavities is defined by a first and second legs spaced apart by a distance $W_C$ and oriented along an angle $\alpha$ relative to a D-axis, wherein the first leg and second leg extend to and are separate from a top bridge, wherein the top bridge defines a segment $L_1$ and a segment $L_2$, each extending between the first leg and the second leg, wherein $L_1$ is spaced apart by distances $W_1$ and $W_2$ and segment $L_2$ is spaced apart by distances $W_2$ and $W_3$, and wherein $$W_1 \leq W_2$$
$$W_2 < W_3$$
$$L_1 < \frac{1}{3} \cdot \frac{W_C}{\sin\alpha}$$
$$L_2 > \frac{2}{3} \cdot \frac{W_C}{\sin\alpha}.$$

11. The rotor of claim 10, wherein the plurality of cavities is configured such that, during operation, a rate of change of airgap flux density associated with each segment differs.

12. The rotor of claim 11, wherein the rate of change of airgap flux density associated with each segment results in a reduction of torque ripple as compared to a cavity having a first section and second section being substantially equivalent in length.

13. The rotor of claim 12, wherein the reduction of torque ripple results in a decrease in iron loss.

14. An electric machine comprising:
a rotor defining a cavity containing a magnet, an outer periphery and a top bridge therebetween, wherein the cavity is defined by a first leg, a second leg, and the top bridge, wherein the first leg and the second leg sandwich the magnet, wherein the top bridge defines a first segment and a second segment, collectively extending between the first leg and the second leg, wherein the first segment has a first length $L_1$ and is positioned closer to the Q-axis than the second segment, and the second segment has a second length $L_2$ greater than the first length $L_1$, wherein the first segment and the second segment each having a distance between the outer periphery and the top bridge that is minimum closest to a Q-axis, maximum closest to a D-axis, and monotonically increases from the minimum to the maximum such that during operation a rate of change of rotor magnetomotive force associated with each segment differs.

15. The rotor of claim 14, wherein the D-axis is defined by a direction of a magnetic flux of a rotor.

16. The rotor of claim 14, wherein each of the at least two segments forms a straight line.

17. The rotor of claim 14, wherein the rotor and a stator, circumferentially surrounding the rotor, each generate a magnetic field that interact to define a harmonic level, and wherein as the harmonic level increases, torque ripple and iron loss increase.

18. The rotor of claim 14, wherein the rate of change of rotor magnetomotive force results in a reduction of torque ripple and iron loss.

19. The rotor of claim 14, wherein each of the segments has a width that is minimum closest to a Q-axis, maximum closest to a D-axis, and monotonically increases from the minimum to the maximum such that during operation a rate of change of rotor magnetomotive force associated with each segment differs.

* * * * *